US012571651B2

(12) United States Patent
Lattemann et al.

(10) Patent No.: US 12,571,651 B2
(45) Date of Patent: Mar. 10, 2026

(54) METHOD AND APPARATUS FOR PROVIDING A HIGH-RESOLUTION DIGITAL MAP

(71) Applicant: Robert Bosch GmbH, Stuttgart (DE)

(72) Inventors: Frank Lattemann, Stuttgart (DE); Thanh Danh Anthony Ngo, Stuttgart (DE); Christian Krummel, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 17/999,770

(22) PCT Filed: May 26, 2021

(86) PCT No.: PCT/EP2021/063999
§ 371 (c)(1),
(2) Date: May 12, 2023

(87) PCT Pub. No.: WO2021/239789
PCT Pub. Date: Dec. 2, 2021

(65) Prior Publication Data
US 2023/0273047 A1 Aug. 31, 2023

(30) Foreign Application Priority Data
May 27, 2020 (DE) ..................... 10 2020 206 641.8

(51) Int. Cl.
*G01C 21/00* (2006.01)
*G06V 20/56* (2022.01)

(52) U.S. Cl.
CPC ..... *G01C 21/3863* (2020.08); *G01C 21/3848* (2020.08); *G01C 21/3878* (2020.08); *G06V 20/56* (2022.01)

(58) Field of Classification Search
CPC ............ G01C 21/3863; G01C 21/3848; G01C 21/3878; G06V 20/56; G06V 10/811; G06F 18/256
See application file for complete search history.

(56) References Cited

U.S. PATENT DOCUMENTS 10,430,691 B1 10/2019 Kim et al.
11,292,462 B1 * 4/2022 Karasev ............... G05D 1/0221
(Continued)

FOREIGN PATENT DOCUMENTS

DE 10 2017 204 839 A1 9/2018
DE 10 2017 207 257 A1 10/2018

OTHER PUBLICATIONS

International Search Report corresponding to PCT Application No. PCT/EP2021/063999, mailed Jul. 27, 2021 (German and English language document) (5 pages).

*Primary Examiner* — Sahar Motazedi
(74) *Attorney, Agent, or Firm* — Maginot, Moore & Beck LLP

(57) ABSTRACT

A method for providing a high-resolution digital map includes locating a device and providing sensor data at a located position during a test drive of the located device. The method further includes ascertaining detection indicators for at least one object detected based on the provided sensor data at the located position, and adding at least one additional layer to the high-resolution digital map. The at least one additional layer includes the ascertained detection indicators for the at least one detected object.

10 Claims, 1 Drawing Sheet

(56) References Cited

U.S. PATENT DOCUMENTS

| | | | |
|---|---|---|---|
| 12,182,694 B2 * | 12/2024 | Farabet | G06V 10/82 |
| 2017/0307751 A1 * | 10/2017 | Rohani | G01S 13/867 |
| 2018/0313652 A1 | 11/2018 | Passmann et al. | |
| 2019/0072977 A1 | 3/2019 | Jeon | |
| 2019/0228262 A1 | 7/2019 | Gonzalez et al. | |
| 2020/0058158 A1 | 2/2020 | Obermeyer et al. | |
| 2020/0072610 A1 | 3/2020 | Hofmann et al. | |
| 2022/0266864 A1 * | 8/2022 | Zuther | B60W 30/146 |
| 2022/0343241 A1 * | 10/2022 | Jha | G08G 1/166 |

* cited by examiner

METHOD AND APPARATUS FOR PROVIDING A HIGH-RESOLUTION DIGITAL MAP

This application is a 35 U.S.C. § 371 National Stage Application of PCT/EP2021/063999, filed on May 26, 2021, which claims the benefit of priority to Serial No. DE 10 2020 206 641.8, filed on May 27, 2020 in Germany, the disclosures of which are incorporated herein by reference in their entirety.

The disclosure relates to a method for providing a high-resolution digital map. The disclosure further relates to an apparatus for providing a high-resolution digital map. The disclosure further relates to a computer program product.

BACKGROUND

Today, automated driving is one of the major trends in the automotive industry. In the last ten years, automotive manufacturers have gradually increased the number and functions of their driver assistance systems. In addition to technical aspects of producing a fully automated vehicle, validation and approval constitute significant challenges for the automotive industry. Reasons for this include the complexity of the interactions with the surroundings and the difficulty in proving that an automated vehicle provides at least the same performance as a human driver in relation to safety.

It is predictable that exclusively real vehicle tests are not economically feasible for validation. For this reason, simulation is regarded as a key element for the development and for the validation of fully automated vehicles. The simulation-based road testing attempt thus represents a significant pillar of the verification and validation strategy. However, all models used must be validated in advance for meaningful simulations. The functions to be ensured are based on virtual models of the environment sensor system of the vehicle. In order to ensure the driving functions, highly accurate sensor models (i.e., mathematical replicas of real sensors) are required, but currently generally recognized quality criteria for evaluating and validating such sensor models are lacking.

Conventional maps do not provide sufficient resolution or enough information about the surroundings for the fully automated system. In this case, the requirements for safety are enormous, particularly in urban areas having a high traffic density. The information contained in today's high-resolution maps is shown as what are known as layers, which each describe different aspects of the surroundings. In this case, there are different definitions as to what information, specifically, is contained in which layer. However, the information about the road network is frequently located on the base layer. Based on this, the further layers describe, for example, traffic signs and static objects such as buildings or trees, etc.

SUMMARY

An object of the disclosure is that of providing a method for improved provision of a high-resolution digital map for an at least partially automated vehicle.

According to a first aspect, the object is achieved by a method for providing a high-resolution digital map, having the steps of:

locating a device, in particular a vehicle;

providing sensor data at a located position during a test drive of the device;

ascertaining detection indicators for at least one object detected by means of the provided sensor data at the located position;

adding at least one additional layer to the high-resolution digital map, wherein the at least one further additional layer includes the detection indicators for the at least one detected object.

The at least one additional layer serves as what is referred to as a "confidence layer" for verifying sensor models. Such additional layers based on pure sensor information would comprise far too much data. The high-resolution digital map extended this way can advantageously be used to improve an algorithm of sensor models, which can be validated and improved as a result. This enables a cost-effective validation of sensor models as a result. The creation of the high-resolution digital map is based on real sensor data of test drives which have to be carried out anyway in order to test sensors. As a result, the high-resolution digital map extended according to the disclosure can be produced with little additional outlay.

According to a second aspect, the object is achieved by an apparatus for providing a high-resolution digital map, comprising:

at least one sensor device for providing sensor data during a test drive;

a locating device for locating a device, in particular a vehicle;

a detection device for ascertaining detection indicators of at least one object detected from the provided sensor data; and an addition device for adding at least one additional layer to the high-resolution digital map, wherein the at least one additional layer includes the detection indicators for the at least one detected object.

According to a third aspect, the object is achieved by a computer program product having program code means for performing the proposed method when it is run on a proposed electronic apparatus or is stored on a computer-readable data carrier.

Advantageous developments of the method are the subject matter of dependent claims in each case.

An advantageous development of the method provides that an additional layer is created for each sensor type. As a result, an additional layer can thereby be created for each sensor type (e.g., radar, lidar, camera, etc.) so that a possibility of verification of sensor models is improved even further.

A further advantageous development of the method provides that the detection indicators are ascertained per sensor type. This supports optimal diversification of the detection indicators for the relevant additional layer of the high-resolution digital map.

A further advantageous development of the method provides that the detection indicators are at least one of the following: distance at which the object was detected; a probability with which the object was detected. For example, the detection indicators for specific static objects can thereby be determined.

A further advantageous development of the method provides that the detection indicators are related to defined weather conditions or that data relating to weather conditions are stored in the high-resolution digital map. This advantageously provides different possibilities for providing detection indicators for different weather conditions.

Further advantageous developments of the method provide that the detection indicators are ascertained while performing the test drive or after performing the test drive.

Advantageously, different possibilities for ascertaining the detection indicators are provided thereby.

A further advantageous development of the method provides that the detection indicators are ascertained in the vehicle or in the cloud. In this way too, different possibilities for ascertaining the detection indicators are advantageously provided.

A further advantageous development of the method provides that locating data are created by means of an SLAM algorithm during the locating, by means of the sensor data provided. Advantageously, different types of locating are carried out by means of the sensor data provided, in both ways mentioned.

A further advantageous development of the method provides that an estimated trajectory is ascertained. For example, the estimated trajectories can be provided by means of an SLAM algorithm known per se such that the sensor models can also be checked by means of SLAM algorithms as a result.

A further advantageous development of the method provides that sensor data for at least one of the following types of sensors are ascertained: radar, lidar, camera, ultrasound. Advantageously, the proposed method is thus suitable for different types of sensors.

The disclosure is described in detail below with further features and advantages on the basis of the drawings. In this case, all of the features described or shown form the subject matter of the disclosure individually or in any combination, irrespective of their summary in the claims or their dependency reference, as well as irrespective of their wording or representation in the description or in the drawings.

BRIEF DESCRIPTION OF THE DRAWINGS

Disclosed features and advantages of the method are derived analogously from disclosed features and advantages of the apparatus, and vice versa.

In the drawings.

DETAILED DESCRIPTION

Figure 1:
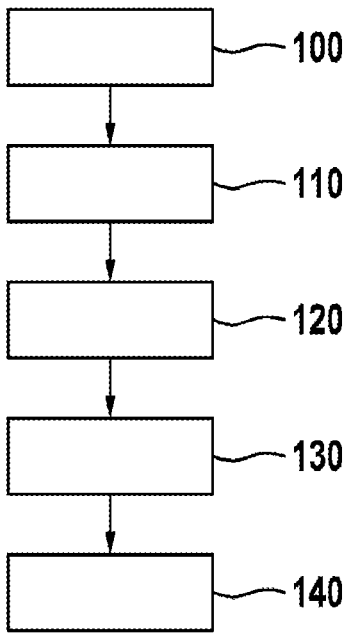
FIG. 1 shows a basic sequence of an embodiment of the proposed method.

A core idea of the disclosure lies in particular in an expansion of a high-resolution digital map (high-definition map, HD map) such that both qualitative and quantitative evaluation of sensor models is made possible using the high-resolution digital map. High-resolution digital maps play an essential role in the field of autonomous driving.

It is proposed that the disclosure should provide an improved high-resolution digital map 300 for an at least partially automated vehicle. In particular, the extension of such a high-resolution digital map 300 comprises a further additional layer 310a . . . 310n, which has what are known as sensor-specific confidence or detection indicators, referred to as key performance indicators (KPI).

These detection indicators represent performance indicators, on the basis of which the progress or the degree of fulfillment can be measured with respect to important objectives or critical success factors. They are defined from the requirements for the sensor system or also from further processing stages, such as an object detection. In order to use these performance indicators as a basis for a comparison with the generated sensor data from the simulation, it is necessary to determine tolerances within which the result of the sensor models is to be regarded as acceptable, since it is to be expected that the real sensor data (from real test drives) and the synthetic sensor data (from simulation drives using sensor models) differ to a certain degree. For this purpose, test drives are carried out using real sensors, and the threshold values relating to location quality are calculated on the basis of the resulting measurement data and marked in the high-resolution digital map 300.

Hereinafter, the term "automated vehicle" is used synonymously with the terms "fully automated vehicle," "autonomous vehicle" and "partially autonomous vehicle."

The steps for generating the at least one additional layer 310a . . . 310n are explained in more detail below. At the beginning, the current position of a device, in particular in the form of an automated vehicle, is ascertained. For this purpose, a locating device can preferably be used for providing GNSS or GPS data, which is used for locating a measurement vehicle (not shown). In the context of a test drive, the measurement vehicle is used to carry out a sensor-based detection of environment data by means of a sensor device, it being possible, for example, for a radar sensor and/or a lidar sensor and/or a camera and/or an ultrasound sensor to be used as sensor devices. In this way, a position of the device can be accurately determined, it being possible for any suitable locating method to be used for this purpose.

After the detection of the individual sensor data, the respective detection indicators can be calculated for at least one object detected from the sensor data. For this purpose, the current position of the vehicle is used to transform the calculated values into a high-resolution digital map 300. Calculating the detection indicators may be performed for one, a plurality or all of the sensor types used by the automated measurement vehicle. In this case, it can be provided for a separate additional layer 310a . . . 310n to be added to the high-resolution digital map 300 for each sensor type used.

In this case, for example a static object (e.g., traffic lights, traffic signs, buildings, etc.) can be ascertained using the detected sensor data. For example, the following may be specified as a detection indicator: the distance (e.g., 50 m) at which a static object is detected by the sensor device and/or the probability with which the static object has been detected by the sensor device, etc. Alternatively or additionally, the detected sensor data can be used to ascertain a predicted trajectory by means of an SLAM algorithm known per se. In this way, an additional layer 310a . . . 310n is created that provides sensor-specific properties as an extension of the high-resolution digital map 300.

It can optionally be provided to create the identified detection indicators for defined weather conditions (e.g., clear vision with sunshine, night, fog, rain, etc.) or to store data relating to the weather conditions as additional information within the additional layer 310a . . . 310n in the high-resolution digital map 300.

The high-resolution digital map 300 improved in this way can advantageously serve as a basis for the validation of sensor models in order to thereby verify that the developed sensor models are modeled sufficiently precisely and with correct properties. In this case, the observed scenarios are extracted from the real test drives in order to reproduce these in the simulation. The scenario can thus be simulated in the virtual surroundings using the developed sensor models. By calculating the detection indicators in the simulation, a comparison can be carried out between the detection indicators which were ascertained using real and using synthetically based sensor data.

As a result, a discrepancy of the performance between the real sensor system and the sensor models is not only visible, but also quantified. Furthermore, the method set out makes it possible not only to validate the sensor models but also to use validated position-dependent models in the simulation.

FIG. 1 is a highly schematic illustration of a basic sequence of a proposed method.

In a step 100, a device, in particular a vehicle, is located.

In a step 110, sensor data are provided at a located position during a test drive of the device.

In a step 120, detection indicators for at least one object detected by means of the provided sensor data are ascertained at the located position.

In a step 130, at least one additional layer 310*a* . . . 310*n* is added to the high-resolution digital map 300, the at least one further additional layer 310*a* . . . 310*n* including the detection indicators for the at least one detected object.

As a result, an extended high-resolution digital map 300 for a device, for example for an at least partially automated vehicle, is thereby provided, by means of which sensor models can be efficiently simulated or validated in a subsequent simulation process. Outlay for validating the sensor models can advantageously be minimized in this way.

In the following, the proposed sequence is examined in greater detail on the basis of an example. For this purpose, what is known as the "simultaneous localization and mapping" (SLAM) algorithm is suitable, as an example, in order to explain the described methodology.

The SLAM algorithm is characterized in that it can be used with all (e.g., three) sensor types (e.g., radar, lidar, camera). The objective of the SLAM algorithm is to simultaneously create a consistent high-resolution digital map 300 of the surroundings, and to estimate its own position within this high-resolution digital map 300. Consequently, a test drive results in both a high-resolution digital map of the surroundings and a predicted trajectory.

In order to evaluate the SLAM algorithm, for example the absolute error of the trajectory estimate relative to the GNSS data can be calculated as a confidence indicator. Since it is to be assumed that this deviation is different for each sensor type, the results of all sensor types are stored and added as a new layer 310*a* . . . 310*n* of the high-resolution digital map 300. This allows the current evaluation result of the system to be recorded in the high-resolution digital map 300.

This has the advantage that, for subsequent examinations, such as a resimulation of a test drive or the comparison after a system update, the calculated confidence indicators of the last system status are stored in a position-dependent manner, and a comparison can thus be carried out efficiently without recalculating the results.

Figure 2:
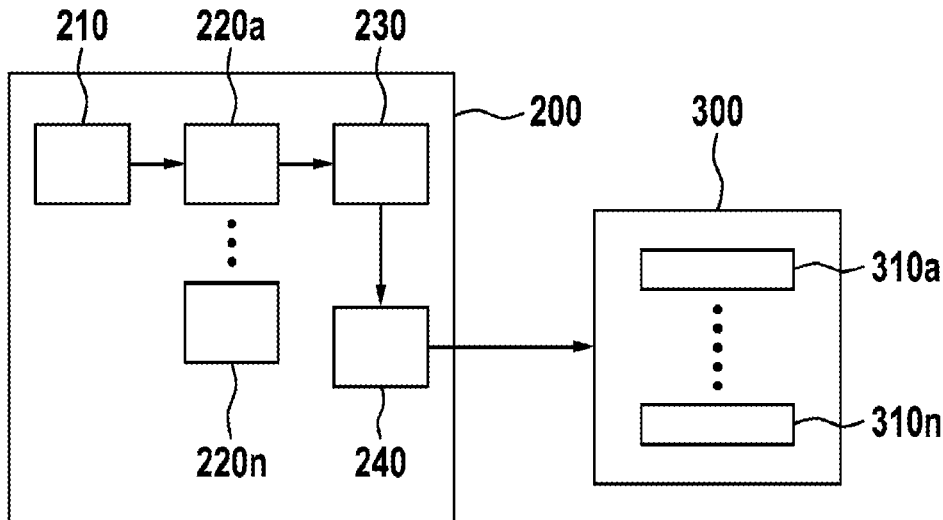
FIG. 2 is a block diagram of a proposed electronic system for carrying out the proposed method.

FIG. 2 is a schematic block diagram of a proposed electronic system 200 for ascertaining a high-resolution digital map 300.

At least one sensor device 220*a* . . . 220*n* for providing sensor data which are recorded during a performed test drive is visible. A locating device 210 for locating the device is functionally connected to the sensor device 220*a* . . . 220*n*. A detection device 230 for ascertaining the detection indicators, described in more detail above, for at least one object detected by means of the provided sensor data is connected functionally to the locating device 20. An addition device 240 for adding at least one additional layer 310*a* . . . 310*n* to the high-resolution digital map 300 having a plurality of layers 310*a* . . . 310*n*, which contain specific information, such as road edges, traffic signs, buildings, etc., is connected functionally to the detection device 230. The at least one additional layer 310*a* . . . 310*n* comprises the detection indicators for the at least one detected object.

Advantageously, the proposed system 200 can be arranged in the automated measurement vehicle or in the cloud. In the first case, the additional layer 310*a* . . . 310*n* is ascertained directly when the sensor data is detected. In the second case, the additional layer 310*a* . . . 310*n* can be ascertained during the test drive or after its completion.

A validation of the sensor models can take place as a special application using the high-resolution digital map 300 according to the disclosure. In this way, it can be demonstrated that the sensor models perform the locating by means of the high-resolution digital map 300 in a similarly successful way to real sensor devices using real sensor data. In this way, the sensor devices can be efficiently tested by means of simulation methods. As a result, this can contribute in practice to an effective validation of automated vehicles with the aid of simulation processes.

Advantageously, the proposed method can be implemented as a software which runs, for example, on the apparatus 200. A simple adaptability of the method is supported in this way.

A person skilled in the art will suitably modify and/or combine the features of the disclosure without departing from the essence of the disclosure.

The invention claimed is:

1. A method for validating an automated vehicle, comprising:

determining a position of the automated vehicle with a position sensor;

providing sensor data captured with at least one sensor of the automated vehicle at the position during a test drive of the automated vehicle;

detecting at least one object based on the provided sensor data at the position;

ascertaining detection indicators for the at least one detected object, the ascertained detection indicators including at least one of (i) a distance at which the at least one detected object was detected, and (ii) a probability with which the at least one detected object was detected;

adding at least one additional layer to a high-resolution digital map, the at least one additional layer including the ascertained detection indicators for the at least one detected object, the at least one additional layer including a respective additional layer for each sensor type of the at least one sensor that captured the sensor data;

validating at least one sensor model for the at least one sensor of the automated vehicle based on the at least one additional layer of the high-resolution digital map; and validating the automated vehicle using simulation-based road testing, the simulation-based road testing including simulating drives of the automated vehicle using the validated at least one sensor model.

2. The method according to claim 1, wherein the ascertained detection indicators are determined for each sensor type of the at least one sensor.

3. The method according to claim 1, wherein:

the ascertained detection indicators are related to defined weather conditions, or data relating to the defined weather conditions are stored in the high-resolution digital map.

4. The method according to claim 1, further comprising:

ascertaining the detection indicators while performing the test drive or after performing the test drive.

5. The method according to claim 1, wherein the ascertained detection indicators are determined by a processor of the automated vehicle or by a remote server.

6. The method according to claim 1, further comprising:

creating locating data based on a simultaneous localization and mapping (SLAM) algorithm during the determining of the position of the automated vehicle using the provided sensor data.

7. The method according to claim 6, further comprising: ascertaining an estimated trajectory.

8. The method according to claim 1, wherein a type of the at least one sensor includes at least one of radar, lidar, camera, and ultrasound.

9. A non-transitory computer program product comprising program code configured to cause an electronic device to perform the method according to claim 1 when the computer program product is run on the electronic device.

10. An electronic system for validating an automated vehicle, the electronic system comprising:

at least one sensor of the automated vehicle configured to capture sensor data during a test drive of the automated vehicle;

a position sensor configured to determine a position of the automated vehicle; and a processor configured to (i) detect at least one object based on the sensor data at the position, (ii) ascertain detection indicators of the at least one detected object, the ascertained detection indicators including at least one of (i) a distance at which the at least one detected object was detected, and (ii) a probability with which the at least one detected object was detected, (iii) add at least one additional layer to a high-resolution digital map, wherein the at least one additional layer includes the ascertained detection indicators for the at least one detected object, the at least one additional layer including a respective additional layer for each sensor type of the at least one sensor that captured the sensor data, (iv) validate at least one sensor model for the at least one sensor of the automated vehicle based on the at least one additional layer of the high-resolution digital map, and (v) validate the automated vehicle using simulation-based road testing, the simulation-based road testing including simulating drives of the automated vehicle using the validated at least one sensor model.

\* \* \* \* \*